Dec. 30, 1969  K. MACHER  3,486,809
VARIFOCAL OBJECTIVE WITH FOUR-COMPONENT FRONT LENS GROUP
Filed March 27, 1967
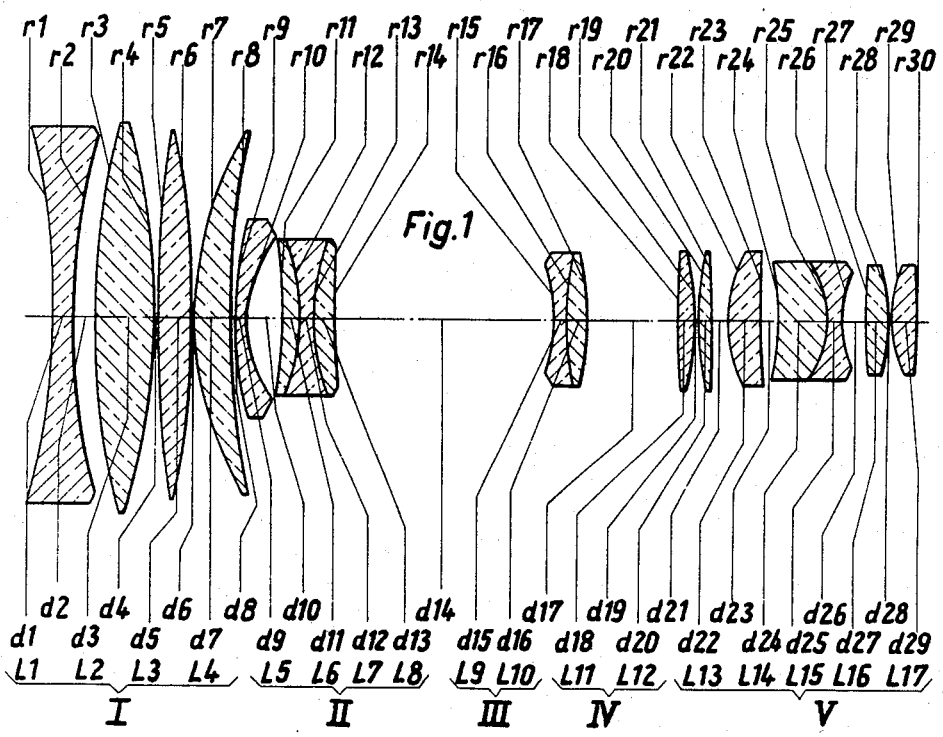
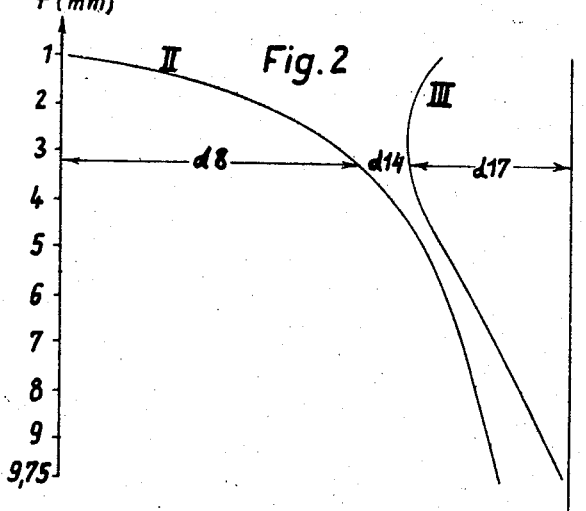
Karl Macher
Inventor.
By Karl G. Ross
Attorney

United States Patent Office 3,486,809
Patented Dec. 30, 1969

3,486,809
VARIFOCAL OBJECTIVE WITH FOUR-COMPONENT FRONT LENS GROUP
Karl Macher, Bad Kreuznach, Germany, assignor to Jos. Schneider & Co., Optische Werke Kreuznach, Bad Kreuznach, Germany, a corporation of Germany
Filed Mar. 27, 1967, Ser. No. 626,172
Claims priority, application Germany, Apr. 5, 1966,
Sch 38,786
Int. Cl. B29d 15/00
U.S. Cl. 350—184                    10 Claims

ABSTRACT OF THE DISCLOSURE

Varifocal objective system with fixed-focus rear lens group and a four-component front lens group of variable focal length, the latter group being composed of a positive and axially fixed first component consisting of a dispersive front lens followed by three collective singlets, a negative and axially movable second component consisting of a dispersive singlet followed by a dispersive triplet with positively refracting cemented surfaces, a negative and axially movable third component consisting of a dispersive doublet with a negative and a positive lens separated by a negatively refracting cemented surface, and a positive and axially fixed fourth component consisting of two air-spaced collective singlets, the objective having a varifocal range of substantially 10:1 with a relative aperture of 2:1.

---

The present invention relates to an improvement of a varifocal optical objective system for photographic or cinematographic cameras as disclosed in my pending U.S. application Ser. No. 295,851 filed July 17, 1963, now Patent No. 3,346,320.

The objective system disclosed in my earlier application is divided, in the usual manner, into a varifocal front attachment and a rear lens group constituting a basic or fixed-focus objective, the front attachment having two axially movable negative components bracketed by two substantially fixed positive components. The term "substantially fixed" allows for the possibility that one of these positive components, especially the one in front, be limitedly adjustable for focusing purposes, either in its entirety or in some of its parts.

As further disclosed in my earlier application, the positive first component of the varifocal front group advantageously consists of four air-spaced singlets including a dispersive front lens and three collective lenses following same, the separation between this front lens and the three following singlets being less than one-fourth of the individual focal length of this particular component; the movable second component, of negative refractivity, consists of two air-spaced dispersive lens members of which the first one is a singlet while the second one is a doublet. The movable negative third component is preferentially also designed as a doublet while the fourth component is a positive singlet. The fixed rear lens group of my earlier disclosure consists of four air-spaced lens members of which the first, second and fourth ones are positive singlets while the third one is a negative doublet.

The aforedescribed system, while operative with relative aperture of 1:1.4, has a varifocal range (i.e. a ratio of its maximum and minimum overall focal length $f_{max}$ and $f_{min}$) of only 6:1, the individual focal length $f_I$ of the front component being substantially larger than $f_{max}$ and amounting to approximately three times the median value of the varifocal range.

The principal object of my present improvement is to provide an objective system of the general type disclosed in my prior application but with a considerably enlarged varifocal range of approximately 10:1, with maintenance of a relative aperture as high as 1:2.

A more particular object of this invention is to provide an improved objective system of the type described wherein, with $f_{min}$ smaller than the image diagonal, the front-lens diameter needs to be only slightly greater than that of the entrance pupil in the position of maximum overall focal length, with complete illumination of the image field even upon adjustment of the first component for focusing at short distances so as to avoid objectionable vignetting during close-ups.

In accordance with my present invention, the individual focal lengths $f_I$, $f_{II}$, $f_{III}$, $f_{IV}$ of the four components of the varifocal front group as well as the individual focal length $f_V$ of the fixed-focus rear group are so dimensioned that $f_{IV}$ is less than 75% of $f_I$ and that the absolute value of $f_{III}$ exceeds by at least 10% the absolute value of $f_{II}$, $f_I$ being less than 4 $f_V$; furthermore, $f_V$ lies approximately at the center of the varifocal range $f_{max}$–$f_{min}$, with the other individual focal lengths $f_I$, $f_{II}$, $f_{III}$ and $f_{IV}$ having their absolute values preferably also included within that range.

To help realize the aforedescribed relationship of the various individual focal lengths, the refractive powers of the second member of the axially movable second component are advantageously distributed over four optically effective surfaces, i.e. the two outer surfaces and the two cemented inner surfaces of a triplet, the cemented inner surfaces being positively refracting and preferably so curved that their combined power has an absolute value ranging between one-third and one-fifth of the absolute value of the combined power of the negatively refracting outer surfaces of the triplet. This triplet may have an overall biconcave configuration and its central lens may also be biconcave, each of its three consitituent lenses having a refractive index $n_d$ greater than 1.6, with the refractive indices of the meniscus-shaped outer lenses exceeding that of the central lens by less than 0.15. This relationship has been found to minimize particularly the transverse chromatic aberration.

A similar distribution of powers can be provided, in accordance with still another feature of my invention, at the axially fixed fourth component by dividing the latter into two closely spaced positive singlets. This measure spreads the strongly collective effect of the fourth component and counteracts an undercorrection of the spherical aberration.

In order to realize the relatively large aperture ratio of 1:2 with a minimum of spherical zonal aberration, I prefer to construct the basic objective or rear lens group from four air-spaced lens members including three positive singlets and one negative doublet, as in the system of my earlier application above identified, yet with the difference that the negative doublet is to occupy the second position rather than the third one within the group. Good chromatic correction is obtained if the refractive indices constituted of this doublet, designed as a biconcave member, are greater than 1.65 and differ by more than 0.03 across the forwardly concave, positively refracting cemented surfaces thereof, yet with a difference of not more than ±5 units between the Abbé members $\nu$ of the constituents of the doublet; this arrangement reduces the curvature of the outer surfaces of the doublet and minimizes the Gaussian aberration.

The use of a doublet as the third component further reduces the chromatic aberation of the overall system. The adjustable front group of my improved system is strongly collective, with convergence of the light rays beyond its fourth component, at least near its lower end of the varifocal range so that the individual focal length $f_V$ of the rear length group may be larger than would otherwise be possible, with resulting flattening of the curvatures of that group.

The invention will be described in greater detail with reference to the accompanying drawing in which:

FIG. 1 diagrammatically illustrates an embodiment of my invention; and

FIG. 2 is a graph showing the relative positions of the two movable components of the adjustable front group of the system of FIG. 1 throughout its varifocal range.

The objective system shown in FIG. 1 comprises four components I, II, III and IV, together constituting a varifocal front group, and a four-member rear group V representing a basic or principal objective from which the varifocal group may be detached if desired. Component I, which may be limitedly axially displaceable for focusing purposes but will otherwise be considered as fixed, consists of a dispersive front lens L1 with radii $r1$, $r2$ and thickness $d1$, a first positive singlet L2 (radii $r3$, $r4$ and thickness $d3$) separated from lens L1 by an air space $d2$ which is less than one-fourth of the individual focal length $f_I$ of component I, a second positive singlet L3 (radii $r5$, $r6$ and thickness $d5$) separated from singlet L2 by an air space $d4$, and a third positive singlet L4 (radii $r7$, $r8$ and thickness $d7$) separated from singlet L3 by an air space $d6$. A variable air space $d8$ separates component I from the axially movable negative component II which consists of a forwardly convex meniscus-shaped negative singlet L5 (radii $r9$, $r10$ and thickness $d9$) and, spaced from it by a distance $d10$, a biconcave triplet composed of a first meniscus-shaped outer lens L6 radii $r11$, $r12$ and thickness $d11$), a biconcave central lens L7 (radii $r12$, $r13$ and thickness $d12$) and a second meniscus-shaped outer lens L8 (radii $r13$, $r14$ and thickness $d13$). Another variable air space $d14$ intervenes between component II and the second axially movable negative component III which is in the form of a forwardly concave meniscus-shaped doublet composed of a biconcave lens L9 (radii $r15$, $r16$ and thickness $d15$) cemented into a biconvex lens L10 (radii $r16$, $r17$ and thickness $d16$). A third variable air space $d17$ exists between component III and the axially fixed positive component IV which consists of two biconvex lenses L11 (radii $r18$, $r19$ and thickness $d18$) and L12 (radii $r20$, $r21$ and thickness $d20$) which are spaced apart a short distance $d19$. Following a further air space $d21$, there is disposed the first lens member L13 of group V in the form of a concavoconvex positive singlet with radii $r22$, $r23$ and thickness $d22$. Next, separated from lens L13 by an air space $d23$, there is a biconcave doublet whose constituent lenses are a positive meniscus L14 (radii $r24$, $r25$ and thickness $d24$) and a biconcave lens L15 (radii $r25$, $r26$ and thickness $d25$). Separated from this doublet by an air space $d26$ is a biconvex lens L16 (radii $r27$, $r28$ and thickness $d27$), followed after an air space $d28$ by the last lens L17 in the form of a biconvex member of radii $r29$, $r30$ and thickness $d29$.

In the following Table A I have listed representative numerical values for the radii $r1$ to $r30$ and the thicknesses and separations $d1$ to $d29$ of lenses L1 to L17, base on a minimum overall focal length $f_{min}$ of one linear unit (e.g. 1 mm.), together with their refractive indices $n_d$ and Abbé numbers $\nu$, given for a spectral wavelength $\lambda=587.6$ m$\mu$ (5876 A.), as well as the refractive powers $\Delta n/r$ for each of the lens surfaces (to be compared with an overall power of unity):

TABLE A

| | | Radii | Thicknesses and Separations | $n_d$ | $\nu$ | $\Delta n/r$ |
|---|---|---|---|---|---|---|
| I | L1 | $r1=-10.268$ | $d1=0.244$ | 1.71736 | 29.51 | $-0.06986365$ |
| | | $r2=+8.963$ | $d2=0.471$ | air space | | $-0.08003570$ |
| | L2 | $r3=+11.058$ | $d3=0.919$ | 1.64050 | 60.08 | $+0.05792186$ |
| | | $r4=-11.058$ | $d4=0.008$ | air space | | $+0.05792186$ |
| | L3 | $r5=+32.114$ | $d5=0.581$ | 1.64050 | 60.08 | $+0.01994457$ |
| | | $r6=-14.211$ | $d6=0.008$ | air space | | $+0.04507071$ |
| | L4 | $r7=+5.358$ | $d7=0.589$ | 1.71300 | 53.89 | $+0.13307204$ |
| | | $r8=+13.256$ | $d8=0.046$ | air space (variable) | | $-0.05378696$ |
| II | L5 | $r9=+4.843$ | $d9=0.163$ | 1.69100 | 54.71 | $+0.14268015$ |
| | | $r10=+1.711$ | $d10=0.650$ | air space | | $-0.40385739$ |
| | L6 | $r11=-5.124$ | $d11=0.252$ | 1.80518 | 25.46 | $-0.15713895$ |
| | | $r12=-2.911$ | $d12=0.163$ | 1.71300 | 53.89 | $+0.03166609$ |
| | L7 | $r13=+2.911$ | $d13=0.317$ | 1.80518 | 25.46 | $+0.03166609$ |
| | L8 | $r14=+10.028$ | $d14=3.981$ | air space (variable) | | $-0.08029317$ |
| III | L9 | $r15=-2.397$ | $d15=0.163$ | 1.71300 | 53.89 | $-0.29745515$ |
| | L10 | $r16=+3.639$ | $d16=0.325$ | 1.68893 | 31.15 | $-0.00661445$ |
| | | $r17=-6.520$ | $d17=1.371$ | air space (variable) | | $+0.10566411$ |
| IV | L11 | $r18=+12.202$ | $d18=0.285$ | 1.52630 | 51.00 | $+0.04313227$ |
| | | $r19=-4.853$ | $d19=0.008$ | air space | | $-0.10844838$ |
| | L12 | $r20=+5.233$ | $d20=0.244$ | 1.52249 | 59.64 | $+0.09984521$ |
| | | $r21=+45.691$ | $d21=0.244$ | air space | | $-0.01143529$ |
| V | L13 | $r22=+2.003$ | $d22=0.488$ | 1.48523 | 81.61 | $+0.24225162$ |
| | | $r23=+21.154$ | $d23=0.325$ | air space | | $-0.02293797$ |
| | L14 | $r24=-4.917$ | $d24=0.772$ | 1.79504 | 28.39 | $-0.16169208$ |
| | | $r25=-1.395$ | $d25=0.167$ | 1.74080 | 28.05 | $+0.03888172$ |
| | L15 | $r26=+1.898$ | $d26=0.366$ | air space | | $-0.39030558$ |
| | L16 | $r27=+5.867$ | $d27=0.382$ | 1.48523 | 81.61 | $+0.08270495$ |
| | | $r28=-3.125$ | $d28=0.045$ | air space | | $+0.15527360$ |
| | L17 | $r29=+2.525$ | $d29=0.374$ | 1.48523 | 81.61 | $+0.19217029$ |
| | | $r30=-12.642$ | | | | $+0.03838237$ |

The objective system represented by the foregoing Table A has a relative aperture of 1:2, a minimum overall focal length $f_{min}$ of one unit and a maximum overall focal length $f_{max}$ of nearly ten units. The variable air spaces $d8$, $d14$ and $d17$, given in the table for the starting position $f=f_{min}$, always add up to 5.398 as illustrated in FIG. 2 which shows the law of motion for the two negative components II and III. In addition, Table B below gives the numerical values of these variable air spaces for five distinct positions of components II and III:

TABLE B

| $f$ | $d8$ | $d14$ | $d17$ |
|---|---|---|---|
| 1.0 | 0.046 | 3.981 | 1.371 |
| 2.0 | 2.077 | 1.645 | 1.676 |
| 5.0 | 3.848 | 0.222 | 1.328 |
| 7.0 | 4.282 | 0.327 | 0.789 |
| 9.75 | 4.589 | 0.769 | 0.040 |

The back-focal length of the objective system is invariably equal to 2.689 units.

The individual focal lengths of components I, II, III, IV and V are calculated as follows:

$$f_\mathrm{I} = +6.92$$
$$f_\mathrm{II} = -2.154$$
$$f_\mathrm{III} = -5.285$$
$$f_\mathrm{IV} = +3.821$$
$$f_\mathrm{V} = +4.513$$

It will thus be seen that the value of $f_\mathrm{V}$ lies close to the midpoint ($f \approx 5.5$) of the varifocal range of the system.

It is to be understood that the values of Tables A and B are valid within tolerance limits of substantially ±10% for the radii $r1$ to $r30$, the thicknesses and separations $d1$ to $d29$, the surface powers $\Delta n/r$ and the Abbé numbers $\nu$ and of substantially ±0.02 for the refractive indices $n_\mathrm{d}$.

I claim:

1. In an optical objective system including a fixed-focus rear lens group, the combination therewith of a forward lens group consisting of a substantially fixed positive first component, an axially movable negative second component, an axially movable negative third component and a fixed positive fourth component; said first component including three air-spaced collective lens members and a dispersive front lens preceding said collective lens members, said front lens being air-spaced from the next one of said collective lens members by a distance less than substantially one-fourth of the individual focal length $f_\mathrm{I}$ of said first component; said second component consisting of two air-spaced dispersive lens members; said second and third components being displaceable between two extreme positions in which the overall focal length of the system assumes respective values $f_\mathrm{min}$ and $f_\mathrm{max}$ defining the lower and upper limits of a varifocal range substantially centered on said individual focal length $f_\mathrm{V}$; said individual focal lengths having substantially the following values:

$$f_\mathrm{I} = +6.92$$
$$f_\mathrm{II} = -2.154$$
$$f_\mathrm{III} = -5.285$$
$$f_\mathrm{IV} = +3.821$$
$$f_\mathrm{V} = +4.513$$

2. The combination defined in claim 1 wherein the ratio of $f_\mathrm{max}$ to $f_\mathrm{min}$ substantially equals 10:1, the system having a relative aperture of 1:2.

3. The combination defined in claim 1 wherein the dispersive lens members of said second component are a forwardly convex meniscus-shaped singlet and, following same, a triplet with two positively refracting cemented surfaces.

4. The combination defined in claim 3 wherein said triplet is biconcave and composed of a biconcave central lens and two meniscus-shaped outer lenses.

5. The combination defined in claim 1 wherein said third component is a forwardly concave meniscus-shaped doublet consisting of two oppositely refractive lenses separated by a forwardly convex and negatively refracting cemented surface.

6. The combination defined in claim 1 wherein said fourth component consists of two air-spaced biconvex singlets.

7. The combination defined in claim 1 wherein said rear lens group consists of a positive first lens member, a negative second lens member, a positive third lens member and a positive fourth lens member all air-spaced from one another.

8. The combination defined in claim 7 wherein the dispersive front lens and the collective lens members of said first component are singlets, the dispersive lens members of said second component being a meniscus-shaped singlet and a triplet, said third component being a meniscus-shaped doublet consisting of two oppositely refractive lenses separated by a negatively refracting cemented surface, said fourth component consisting of two air-spaced collective singlets, the negative second lens member of said rear lens group being a biconcave doublet, said positive first, third and fourth lens members of said rear lens group being singlets.

9. The combination defined in claim 8 wherein said biconcave doublet is composed of two constituent lenses of opposite refractivity separated by a forwardly concave and positively refracting cemented surface.

10. The combination defined in claim 9 wherein the numerical values of the radii $r1$ to $r30$ and the thicknesses and separations $d1$ to $d29$ of said front lens L1, said three air-spaced collective lens members L2, L3, L4, said meniscus-shaped singlet L5, the constituents L6, L7, L8 of said triplet, said oppositely refractive lenses L9, L10 of said meniscus-shaped doublet, said two air-spaced collective singlets L11, L12, said first lens member L13, the constituent lenses L14, L15 of said second lens member, said third lens member L16 and said fourth lens member L17, based upon an overall minimum focal length $f_\mathrm{min}$ of numerical value 1, their refractive indices $n_\mathrm{d}$ and their Abbé numbers $\nu$, for a wavelength $\lambda = 587.6$ m$\mu$, are substantially as given in the following table:

|  | Radii | Thicknesses and Separations | $n_\mathrm{d}$ | $\nu$ |
|---|---|---|---|---|
| L1 | $r1 = -10.268$ | $d1 = 0.244$ | 1.71736 | 29.51 |
|  | $r2 = +8.963$ | $d2 = 0.471$ | air space |  |
| L2 | $r3 = +11.058$ | $d3 = 0.919$ | 1.64050 | 60.08 |
|  | $r4 = -11.058$ | $d4 = 0.008$ | air space |  |
| L3 | $r5 = +32.114$ | $d5 = 0.581$ | 1.64050 | 60.08 |
|  | $r6 = -14.211$ | $d6 = 0.008$ | air space |  |
| L4 | $r7 = +5.358$ | $d7 = 0.589$ | 1.71300 | 53.89 |
|  | $r8 = +13.256$ | $d8 = 0.046$ | air space (variable) |  |
| L5 | $r9 = +4.843$ | $d9 = 0.163$ | 1.69100 | 54.71 |
|  | $r10 = +1.711$ | $d10 = 0.650$ | air space |  |
| L6 | $r11 = -5.124$ | $d11 = 0.252$ | 1.80518 | 25.46 |
| L7 | $r12 = -2.911$ | $d12 = 0.163$ | 1.71300 | 53.89 |
| L8 | $r13 = +2.911$ | $d13 = 0.317$ | 1.80518 | 25.46 |
|  | $r14 = +10.028$ | $d14 = 3.981$ | air space (variable) |  |
| L9 | $r15 = -2.397$ | $d15 = 0.163$ | 1.71300 | 53.89 |
| L10 | $r16 = +3.639$ | $d16 = 0.325$ | 1.68893 | 31.15 |
|  | $r17 = -6.520$ | $d17 = 1.371$ | air space (variable) |  |
| L11 | $r18 = +12.202$ | $d18 = 0.285$ | 1.52630 | 51.00 |
|  | $r19 = -4.853$ | $d19 = 0.008$ | air space |  |
| L12 | $r20 = +5.233$ | $d20 = 0.244$ | 1.52249 | 59.64 |
|  | $r21 = +45.691$ | $d21 = 0.244$ | air space |  |
| L13 | $r22 = +2.003$ | $d22 = 0.488$ | 1.48523 | 81.61 |
|  | $r23 = +21.154$ | $d23 = 0.325$ | air space |  |
| L14 | $r24 = -4.917$ | $d24 = 0.772$ | 1.79504 | 28.39 |
| L15 | $r25 = -1.395$ | $d25 = 0.167$ | 1.74080 | 28.05 |
|  | $r26 = +1.898$ | $d26 = 0.366$ | air space |  |
| L16 | $r27 = +5.867$ | $d27 = 0.382$ | 1.48523 | 81.61 |
|  | $r28 = -3.125$ | $d28 = 0.045$ | air space |  |
| L17 | $r29 = +2.525$ | $d29 = 0.374$ | 1.48523 | 81.61 |
|  | $r30 = -12.642$ |  |  |  |

(References on following page)

References Cited

UNITED STATES PATENTS
3,363,964  1/1968  Macher ------------ 350—176

FOREIGN PATENTS
1,417,663  10/1965  France.

DAVID SCHONBERG, Primary Examiner
P. A. SACHER, Assistant Examiner

U.S. Cl. X.R.
350—186